United States Patent [19]
Esposito

[11] Patent Number: 5,697,339
[45] Date of Patent: Dec. 16, 1997

[54] ELECTRONIC GOVERNOR DEVICE FOR AGRICULTURAL TRACTOR ENGINE

[75] Inventor: Giovanni Esposito, Bernareggio, Italy

[73] Assignee: Same Deutz-Fahr S.p.A., Treviglio, Italy

[21] Appl. No.: 774,426

[22] Filed: Dec. 30, 1996

[30] Foreign Application Priority Data

Jun. 17, 1996 [IT] Italy ................. TO96A0518

[51] Int. Cl.⁶ ................................. F02D 31/00
[52] U.S. Cl. ........................ 123/357; 73/119 A
[58] Field of Search ................. 123/357, 358, 123/359; 73/116, 119 A; 364/431.01, 431.04

[56] References Cited

U.S. PATENT DOCUMENTS

| | | | |
|---|---|---|---|
| 4,028,532 | 6/1977 | Reuther | 364/494 |
| 4,116,052 | 9/1978 | Paluka | 364/431.01 |
| 4,277,830 | 7/1981 | Reid | 73/116 |
| 4,760,830 | 8/1988 | Bullis | 123/357 |
| 4,805,571 | 2/1989 | Humphrey | 123/316 |
| 4,844,035 | 7/1989 | Takagi | 123/357 |
| 4,912,968 | 4/1990 | Northdurft | 73/119 A |
| 4,915,072 | 4/1990 | Caron | 123/357 |
| 5,483,486 | 1/1996 | Javanifard | 365/185.17 |

*Primary Examiner*—Carl S. Miller
*Attorney, Agent, or Firm*—Sughrue, Mion, Zinn, Macpeak & Seas, PLLC

[57] ABSTRACT

An electronic governor device for adjusting the rotation speed of an agricultural tractor engine including a programmable electronic control unit and an electromecanical actuator controlled by the electronic unit to adjust the flow of fuel delivered to the engine. A plug-in memory card device is provided to store, during engine factory testing, typical engine data including calibration parameters, and to be subsequently applied to the governor device for configurating thereof according to these typical engine data following plug-in of the memory card device into the electronic control unit.

10 Claims, 2 Drawing Sheets

5,697,339

ELECTRONIC GOVERNOR DEVICE FOR AGRICULTURAL TRACTOR ENGINE

FIELD OF THE INVENTION

The present invention relates electronic governor devices for adjusting the rotation speed of agricultural tractor engines, of the type comprising a programmable electronic control unit, detecting means of the engine speed set by the operator and detecting means of the actual engine speed operatively connected to said electronic control unit, and an electromechanical actuator controlled by said electronic control unit for adjusting the fuel flow delivered to the engine.

PRIOR ART

In the known governor devices of the type defined heretofore, for each possible engine to which the electronic governor device can be applied, in the memory of the electronic control unit a check-up table is provided, describing the electric current curve in the electromechanical actuator as a function of the number of revolutions of the engine, for instance at 50 RPM intervals.

These electric current values are absolute and cannot be trimmed to compensate variations among engines of the same type. To guarantee that the maximum power delivered by the engine (at the maximum power rating) is within the tolerance specified on the homologation paper, during engine calibration the load of the return spring of the electromechanical actuator rotor is adjusted so that at the maximum power rating, the engine being loaded with an appropriate load and the electronic control unit delivering the electric current corresponding to the maximum theoretical power (of the particular chosen engine family), an actual maximum power corresponding to the nominal ratings can be achieved. However, this operation produces undesired effects.

First of all, modifying the load of the return spring involves modification of the electromecanical actuator characteristics and, therefore, the torque curve is shifted from the theoretical one. As a consequence, constancy can be guaranteed only for the point of the torque curve which corresponds to the maximum power of the engine, but not for the remaining part of the torque curve.

Furthermore, the actuator return spring having limited load regulation capabilities, compensation of the unavoidable characteristic variations from one engine to another cannot be always achieved, hence it is not always possible to lay within the tolerance band of the maximum power.

On the other hand, since the actuator is calibrated on a specific engine, if the electromecanical actuator has to be replaced, the engine shall not generally maintain the same operation characteristics.

Finally, the electromechanical actuator can be easily tampered, simply acting on the existing load regulation screw of the spring thereof.

THE INVENTION

It is therefore an object of the present invention to provide a governor device as set heretofore which enables to overcome the above mentioned problems.

A further object of the present invention is to provide a configurating system which allows programming the electronic control unit of the governor device during engine testing.

According to a first aspect, the invention relates to an electronic governor device for an agricultural tractor engine as set forth in the above, essentially characterized in that it further comprises a plug-in memory card device arranged to record, during factory testing of the engine, typical data of said engine including calibration parameters, and afterwards to be plugged into the governor device, so as to configurate said governor device according to said typical data of the engine, following connection of said plug-in memory card device to said electronic control unit.

Further characteristics of the governor device of the invention are as set forth in the dependent claims 2 to 7.

According to another aspect, the invention relates to a method for configurating the governor devices as set forth heretofore, and having the characteristics defined in the independent claim 8 and the dependent claims 9 and 10.

BRIEF DESCRIPTION OF THE DRAWINGS

The invention will now be described by way of example with reference to the accompanying drawings in which.

DETAILED DESCRIPTION OF THE INVENTION

Figure 1:
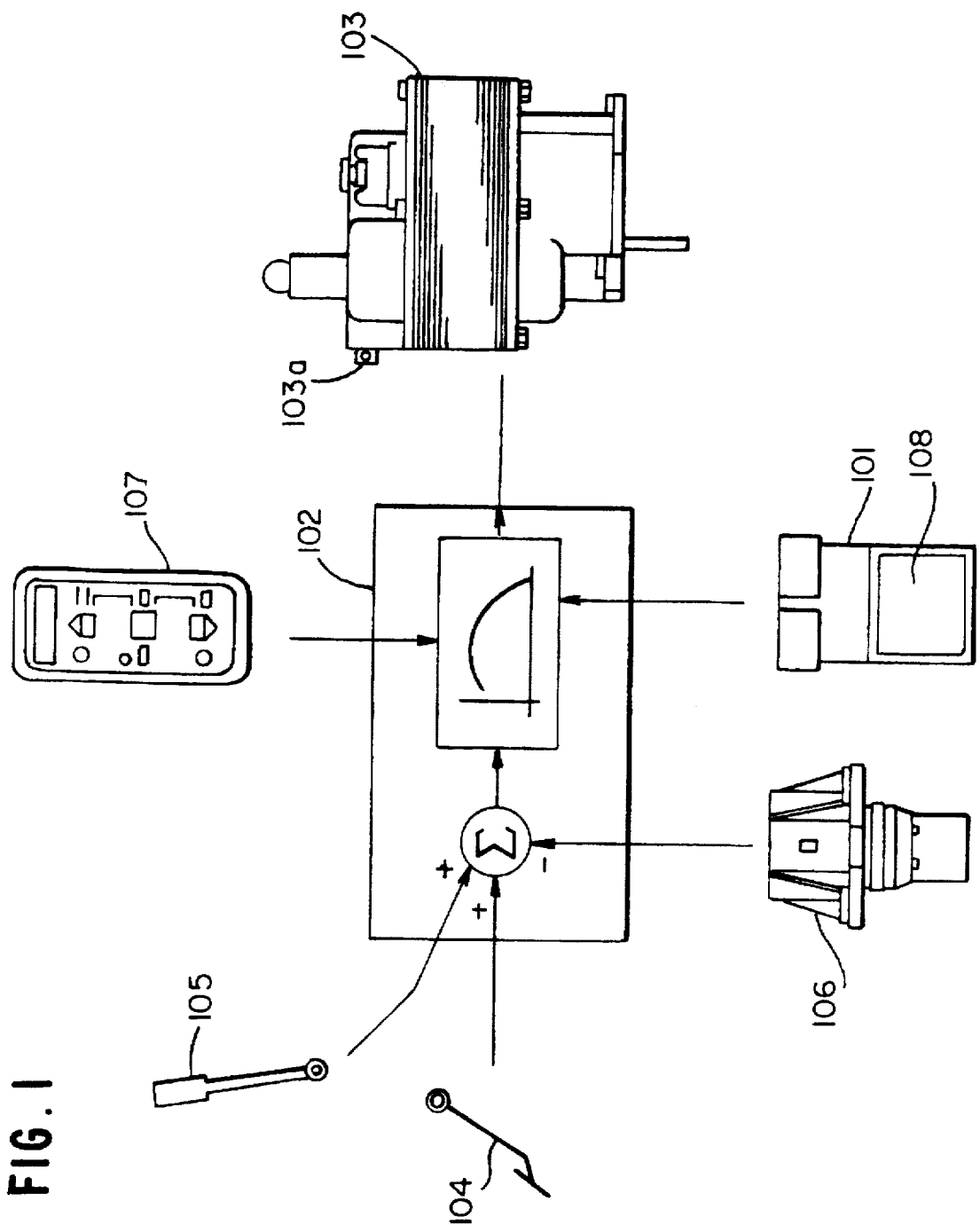
FIG. 1 is a block diagram of a rotation speed electronic governor device according to the invention, showing the logical connections between the various component elements thereof.

With reference to FIG. 1, the governor device according to the invention comprises an electronic control unit 102 (ECU) which inputs by means of a speed sensor (not shown in detail since conventional) coupled, for instance, to a tractor engine shaft 106 electrical signals related to the actual speed of the tractor engine, and by means of a position sensor (even not shown in detail since conventional) coupled to the accelerator pedal 104, electrical signals indicative of the speed set by the operator of the tractor.

By analysing the difference between the set and the actual speed, the ECU 102 regulates the electric current in a electromecanical actuator 103, of a conventional type thus not depicted in detail in the figures, which in turn controls the position of a rack-bar which drives the fuel injection pumps of the engine, so as to adjust accordingly the flow rate of fuel to be delivered to the engine combustion chambers.

Briefly, the actuator 103, supplied with continuous current, includes in a conventional way a stator winding, a rotor assembly which can perform a maximum rotation of about 33°, and a return spring contrasting the rotor motion and bringing it back to its rest position when the electric current is null. If the spring load is considered as constant, the current flowing in the actuator produces a force which withstands the reaction of the spring and generates an equilibrium point of the rotor. Increasing the current, the angular run of the rotor increases.

There is a linear correspondence between the electric current in the actuator 103 and the displacement of the rack-bar and therefore, between this electric current in the actuator 103 and the flow rate of the fuel to the pumps.

According to the sign and to the absolute value of the difference between the set speed and the actual speed, the ECU 102 increases or decreases the electric current in the actuator 103. For stability reasons, the variation speed of the current is set according to coefficients depending on the speed of the engine and recorded in a check table in the ECU 102 memory.

The current in the actuator 103 corresponds to the power delivered by the engine at any possible speed. In the ECU 102 memory there is a check up table, in steps of 50 RPM for example, which describes the maximum power curve and, therefore, the maximum electric currents to be set for the actuator 103, over the entire range from minimum to maximum speed For each possible speed of the engine, the electric current in the actuator 103 is linearly varied until it reaches the value written in the check-up table of the ECU 102 which corresponds, at that rate, to the maximum power. For any further power request, the maximum electric current value is limited at the maximum value in the check-up table.

Only for the sake of description completeness, the governor device can further comprise a keyboard 107 to record and recall a certain number of preset rotation speeds of the engine, and a further position sensor (not shown in the drawings since conventional) coupled to a hand-actuated accelerator lever 105.

According to the invention herein disclosed, the system further comprises a memory module device 101 (which will be in the following designated as plug-in memory), which is designed as a memory card that can be bought blank from an electronic component manufacturer, is then loaded with the necessary data during the final engine test runned by the manufacturer of the engine, and is finally fitted on the tractor so as to enable this plug-in memory 101 to exchange data with the ECU 102, according to the procedures that will now be disclosed in the following.

In the governor device according to the present invention the actuator 103 is as stated similar to one of a conventional type, but without the possibility to adjust the load of the related return spring. To such effect direct access from outside to the trimming system of the return spring can be prevented by any suitable expedients, for instance by means of an external unreleasable cover 103a.

When the actuator 103 is then fitted onto the engine, it is practically impossible to make any adjustments thereof: accordingly, the characteristics of the actuator 103 will always be the same and guaranteed as such by the manufacturer of this component.

The ECU 102 is non specific and bears in its memory, for instance, up to thirty possible check up tables which describe with different relative and non absolute parameters (electric current values) the shapes of the maximum torque curves of thirty possible different engine types for agricultural tractors.

The plug-in memory 101 comprises by way of example a plastic container of about 30×50×15 mm, a conventional four-way male connector and a conventional EEPROM memory device, which is programmed by the engine manufacturer during the final engine test and engine calibration as disclosed hereinafter.

Among others, this plug-in memory 101 stores also the following parameters: engine type (a value from 1 to 30); engine serial number; electric current in the actuator 103 corresponding to the maximum engine power; electric current in the actuator corresponding to other operating points, for example 5, of the engines torque curve; a check sum whose value enables to check if the programmed data are correct; and some other parameters among which, for example, a code of the operator having performed the calibration.

Once the plug-in memory 101 is programmed, a plastic sticker 108 is printed out on which at least some of the programmed parameters are written. This sticker 108 is then sticked on the plug-in memory 101.

Following programming, the plug-in memory 101 is physically enclosed with its related engine, conveniently after being inserted in a plastic envelope which protects it from environmental agents during engine shipping to the tractor assembly line. Once the engine is fully assembled with the tractor, and before the tractor final testing, the plug-in memory 101 is connected to the ECU 102 by means of a connector and associated short cable (of approximately 30 cm or less). In order to enable the ECU 102 to obtain the maximum torque curve of the engine fitted on the specific tractor, a start up procedure is provided for, in which the ECU 102 reads data from the plug-in memory 101 and calculates the absolute values of the electric currents which have to be delivered to the actuator 103.

Configurating the governor device according to the invention is carried out in two distinct steps.

The first step is undergone at the engine manufacturer plant where it is available, during the engine testing, an electronic instrumentation bench 202 arranged to calibrate the engine and to program the plug-in memory 101 with a number of parameter measured during the bench testing, such as clarified herebelow.

Figure 2:
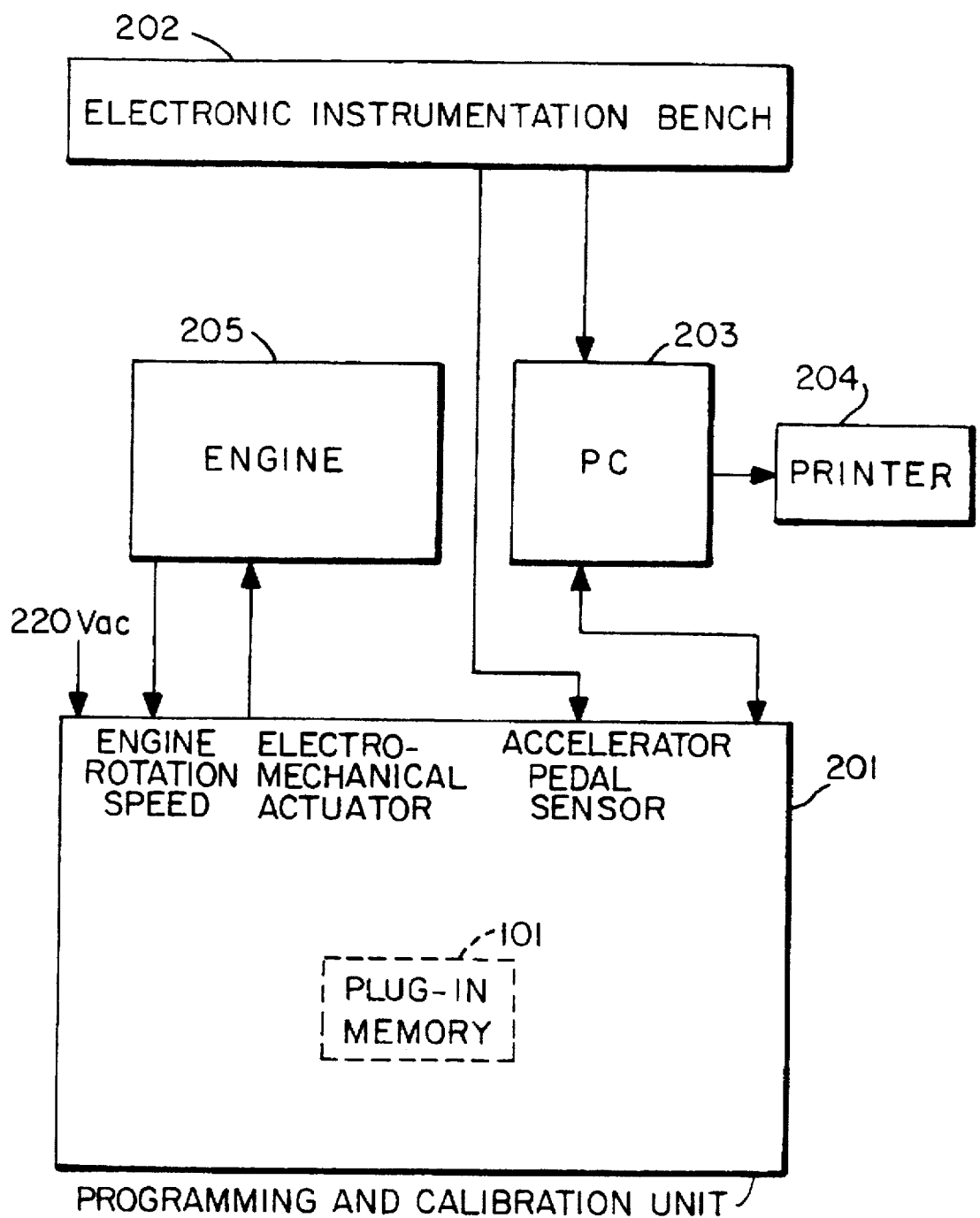
FIG. 2 is a block diagram showing the various elements to put into practice the method according to the invention.

With reference to FIG. 2, the engine 205 is installed on the testing bench 202 and warmed up to its working temperature. In the meanwhile the operator starts up a blank plug-in memory 101, inputting identification data of the engine under test, by means of a PC 203 which is interfaced both with the testing bench 202 and with a programming and calibration unit 201. These data will include, for example, the engine type and its serial number.

The engine 205, which is already equipped with the speed sensor coupled to the engine shaft 106 and with the electromechanical actuator 103, which are both electrically connected to the programming and electronic calibration unit 201, is put under test on a variable load basis. The program in the PC 203 coordinates the various testing steps according to the type of engine under test, either automatically or following the operator's instructions, so as to acquire for a plurality of engine functional points the electric current values in the actuator 103, the engine rotational speed, the maximum delivered power and any other data which may be necessary to configurate the speed governor. Once the variable load test is over, the PC 203 extrapolates running characteristic points of the engine from the input data and then loads these data into the plug-in memory 101. In the meanwhile a printer 204 prints these data on sticker 108 which is then applied to the plug-in memory 101. The plug-in memory 101 is then sealed in a plastic envelope and enclosed with the engine for shipping.

The second configurating step of the governor device is carried out at the tractor manufacturing plant where, after completing assembling of the tractor with the engine 205 and with the electronic control unit 102 of the governor device and related wiring, the plug-in memory 101, which is still in the sealed plastic envelop attached to the engine, is picked up and plugged into a corresponding connector (not shown since conventional) of the governor device.

The electronic control unit 102 is capable through a check-sum algorythm to validate the plug-in memory 101 data, and if the engine type fitted on the tractor corresponds to the designated one, then the ECU 102 inputs in its own memory, from the plug-in memory 101, the peculiar calibration points of the engine, and enables its start up. Engine start up would not be enabled if the plug-in memory 101 is for any reason removed.

The advantages deriving from the present invention can be summarized as follows.

If the actuator 103 is replaced, there is no modification of the running parameters of the engine since this actuator 103 can not be tampered and its characteristics are guaranteed by the manufacturer of the device itself.

The ECU 102 is non specific and even if it is replaced, there is no change in the peculiar data of the engine.

The engine special features are recorded in the plug-in memory 101. The possibility of a failure event of this device is much lower than for the other components of the system, as it is only comprised of the integrated circuit EEPROM sealed inside a tight proof housing. And in case of failure of this device, authorised personnel will by means of a special programmer reprogram a new plug-in memory with the same data as the original one, being these available from the sticker on the replaced plug-in memory 101 itself.

It is to be understood, that within the scope of the appended claims, the invention may be practiced otherwise than as specifically set forth herein.

What is claimed is:

1. Configurating method of an electronic governor device for adjusting the rotation speed of an agricultural tractor engine including a programmable electronic control unit, detecting means of the engine speed set by the operator and detecting means of the actual engine speed operatively connected to said electronic control unit, and an electromechanical actuator controlled by said electronic control unit for adjusting the fuel flow delivered to said engine, comprising the steps of:

providing an engine testing bench, providing a plug-in memory card device, providing a programming and calibrating electronic unit for said plug-in memory card device, interfacing said programming and calibrating electronic unit with said engine testing bench and connecting said programming and calibrating electronic unit to said means for detecting the actual speed of the engine and to said electromechanical actuator, programming said plug-in memory card device with engine qualification and identification data through said programming and calibrating electronic unit, bench testing the engine and acquiring, by means of said programming and calibrating electronic unit, a plurality of typical running data of the engine, extrapolating, from said running data of the engine, calibration parameters of the engine and programming thereof in said plug-in memory card device through said programming and calibrating electronic unit, enclosing said plug-in memory card device with the engine and assemblying said engine onto a tractor provided with said electronic control unit, plugging said plug-in memory card device into said electronic control unit and configurating thereby said governor device.

2. Method according to claim 1, further comprising hermetically sealing said plug-in memory card device after programming thereof.

3. Method according to claim 1, further comprising the step of providing a writing support, printing said engine typical running data on said writing support, and securing said writing support on the outside of said plug-in memory card device.

4. An electronic governor device for adjusting the rotation speed of an agricultural tractor engine including a programmable electronic control unit, detecting means of the engine speed set by the operator and detecting means of the actual engine speed operatively connected to said electronic control unit, and an electromechanical actuator controlled by said electronic control unit for adjusting the fuel flow delivered to said engine, and further comprising a plug-in memory card device arranged to record, during factory testing of the engine, typical data of said engine including calibration parameters, and afterwards to be plugged into said governor device, so as to configurate said governor device according to said typical data of the engine following connection of said plug-in memory card device to said electronic control unit.

5. Device according to claim 4, wherein said plug-in memory card device includes non-volatile memory means and plug-in electrical connection means for connection thereof to said electronic control unit.

6. Device according to claim 5, wherein said electronic control unit further comprises:

means for reading said non-volatile memory means, means for verifying the validity of the data stored in said non-volatile memory means, automatic configurating means of the control characteristics of said electronic control unit.

7. Device according to claim 4, wherein said engine typical data include:

engine qualification and identification data, electrical supply current values of said electromechanical actuator corresponding to the engine maximum power and to a plurality of peculiar operating points of the engine, further engine bench calibration parameters.

8. Device according to claim 7, wherein said plug-in memory card device is provided with a writing section listing at least part of said engine tipical data.

9. Device according to claim 4, further comprising manual selector means operatively connected to said electronic control unit to selectively set and recall predetermined values of the engine rotation speed.

10. Device according to claim 4, wherein said electromechanical actuator comprises means to prevent tampering bench calibration of said electromechanical actuator.

* * * * *